United States Patent [19]

Chemaly, Ephrem A.

[11] Patent Number: 5,058,177
[45] Date of Patent: Oct. 15, 1991

[54] METHOD FOR INSPECTION OF PROTRUDING FEATURES

[75] Inventor: Chemaly, Ephrem A., Austin, Tex.

[73] Assignee: Motorola, Inc., Schaumburg, Ill.

[21] Appl. No.: 577,845

[22] Filed: Aug. 31, 1990

Related U.S. Application Data

[63] Continuation of Ser. No. 140,705, Jan. 4, 1988, abandoned.

[51] Int. Cl.⁵ ............................................. G06K 9/00
[52] U.S. Cl. .......................................... 382/8; 582/48; 358/101; 358/106; 358/107
[58] Field of Search ...................... 382/1, 8, 30, 34, 41, 382/48, 49; 358/101, 106, 107; 356/388, 375, 392, 394, 398; 364/488

[56] References Cited

U.S. PATENT DOCUMENTS

| | | | |
|---|---|---|---|
| 4,472,056 | 9/1984 | Nakagawa et al | 356/398 |
| 4,553,843 | 11/1985 | Langley et al. | 356/375 |
| 4,644,585 | 2/1987 | Crimmins et al. | 382/48 |
| 4,665,551 | 5/1987 | Sternberg et al. | 382/27 |
| 4,672,562 | 7/1987 | Egli et al. | 364/559 |
| 4,692,690 | 9/1987 | Hara et al. | 382/8 |
| 4,696,047 | 9/1987 | Christian et al. | 382/8 |

Primary Examiner—Michael Razavi
Assistant Examiner—Jose L. Couso
Attorney, Agent, or Firm—Jasper W. Dockrey

[57] ABSTRACT

An automatic system for the inspection of a plurality of protruding features of an object employing computer vision. The system examines the position of a tip of the feature and compares it with an ideal position to determine if the object is defective or not. The position of the tip is calculated from a cluster of perceived pixels above a certain threshold of light intensity. In one embodiment, mathematic morphological manipulations of the gray scale perceived pixels assists in the analysis of the positions of the protruding features. The system provides an objective, fast and economical method of inspecting objects, such as electronic packages having a plurality of leads protruding therefrom.

8 Claims, 4 Drawing Sheets

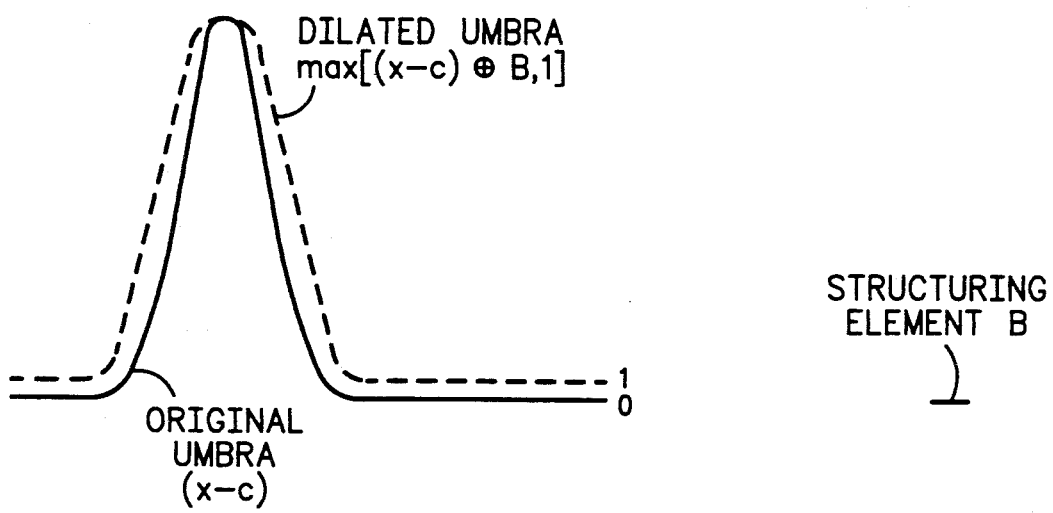
FIG.8a  FIG.8b
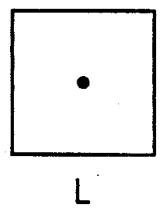
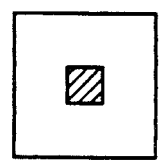
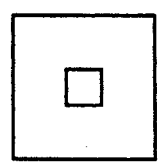
FIG.9a  FIG.9b  FIG.9c
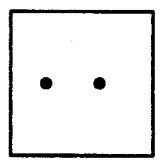
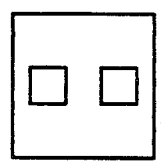
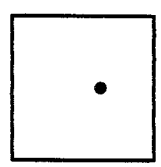
FIG.10a  FIG.10b  FIG.10c

METHOD FOR INSPECTION OF PROTRUDING FEATURES

This application is a continuation of prior application Ser. No. 140,705, filed Jan. 4, 1988, and now abandoned.

CROSS-REFERENCE TO RELATED APPLICATION

This application is related to co-pending patent application Ser. No. 07/140,704, relating to the automatic inspection of the surfaces of objects, filed of even date.

FIELD OF THE INVENTION

The invention relates to automatic inspection systems, and in particularly relates to the automatic visual inspection of a plurality of protruding features on an object.

BACKGROUND OF THE INVENTION

In the competitive production of products, it is common to inspect the products with respect to performance, physical integrity, physical dimensions, cosmetic appearance, etc. before the products are sold. As competition becomes tighter, manufacturers move from classical manual labor intensive methods to more sophisticated techniques using automation. One of the newest techniques of automatic inspection or quality control is to use computer vision techniques by which a computer receives data from an optical system and processes the data to determine if a particular product passes inspection.

While electronic devices have long been tested internally by high-speed automatic testing and handling equipment, computer vision inspection systems are now being developed to inspect the outside of electronic packages. This task has proven considerably more difficult than testing the interior circuitry. Ideally, such systems should inspect both the package body and the leads that extend from the package body.

Developing an automated visual inspection system for a particular device requires careful design. First, there must be an objective, quantifiable visual test standard for the part. Commercial general purpose inspection systems are not trainable by presenting them with a collection of good and defective parts and a few general words of guidance. Second, the inspection requirements are used to specify the image acquisition parameters, such as lighting, background, the required image resolution. Very important is the size of the digital image sent to the computer. The greater the digital image, the larger the number of bits that must be stored and manipulated by the computer or processor, which slows the inspection time.

Third, an image analysis strategy must be designed, processing algorithms developed, and a classification scheme defined. Fourth, an appropriate parts handling mechanism is needed to present the parts to the vision system. Of course, the performance of any computer inspection system must be measured by comparing its results with the independently and presumably accurate parts classification prepared from the existing manual inspection.

However, the demonstration of a satisfactory method for inspecting a particular electronic package is not, by itself, a sufficient basis to use an automatic inspection system. For a production machine to be implemented, the inspection system must also meet cost, speed, reliability, and size constraints, as well as ease of integration with existing production methods.

It is only when all of the above requirements have been considered that a successful implementation of an automated visual inspection system can be achieved. In addition, it would be desirable if a particular inspection system could be readily adaptable to various electronic device packages. Such a system should also be able to be adapted to inspect other objects having a plurality of similar projecting features that need to have specified positions.

SUMMARY OF THE INVENTION

Accordingly, it is an object of the present invention to provide an automatic, optical inspection system that can inspect the protruding features of objects for missing or bent features, such as inspecting the leads of electronic device packages for missing leads and bent leads.

It is another object of the invention to provide an automatic, optical inspection system that implements objective, quantifiable visual test standards for a particular part type.

Another object of the present invention is to provide an automatic, optical inspection system that is superior to manual inspection of the leads of electronic packages and other objects having protruding features that must be in a particular configuration.

Still another object of the present invention is to provide an automatic, optical inspection system that may be easily integrated with existing production methods.

In carrying out these and other objects of the invention, there is provided, in one form, a method for inspecting a plurality of similar protruding features on objects to determine whether the object is "good" or "bad". The method first involves providing a plurality of objects individually at an inspection station, where each object has a plurality of protruding features having tips as a terminal end thereof. Next, only the tips of the features of a single object are illuminated with a light source to generate a pattern of tip images corresponding to the object. The pattern of tip images is perceived, such as by a camera, and the pattern is compared with a predetermined standard. It is next decided (1) whether the tip images are within the predetermined standard and the corresponding object is denoted as "good" or (2) whether the tip images are outside the predetermined standard and the object is denoted as "bad". Finally, the "good" objects are sorted from the "bad" objects.

BRIEF DESCRIPTION OF THE DRAWINGS

FIGS. 8a–b is a morphological representation of an image of a lead before and after dilation by a structuring element;

FIG. 9a–c is a morphological representation of the creation of the mask used in an alternative method of lead inspection; and FIG. 10–c is a morphological representation of the inspection of the leads used in the alternate inspection method.

DETAILED DESCRIPTION OF THE INVENTION

A new method for automatically inspecting the positions and presence of a plurality of protruding features on an object which uses computer vision has been discovered. The system is particularly suited for inspecting the leads of an electronic package. Such leads are examined for their presence and their alignment in two directions.

In a particular application, the term "computer vision" describes a discipline which may include the study of optics, imaging, image processing, pattern recognition, artificial intelligence, etc.

During the course of the description of the invention, the object to be inspected is an electronic package, and the protruding features on the objects are the leads or pins extending from the package. The package to be inspected will be taken to be a dual in-line package or DIP, for the purposes of illustration only as an example of a package that is well-known in the art. It is anticipated that other package configurations, such as pin grid arrays (PGAs), among others, could also be inspected using the invention after the physical equipment is rearranged by one skilled in the art following the principles of the invention. Indeed, other objects with protruding features could be inspected with an analogous system. The inventive system is particularly suited for examining protruding features that must be coplanar, positioned or aligned in one or more dimensions. The leads of an electronic package should be coplanar with respect to the plane on which they terminate (and on which the package is to be mounted), the leads along one side of the package must be aligned and the leads on any particular side must have a precise spacing from each other. The system of this invention examines the parts for these parameters.

OVERALL VISION SYSTEM

Figure 1:
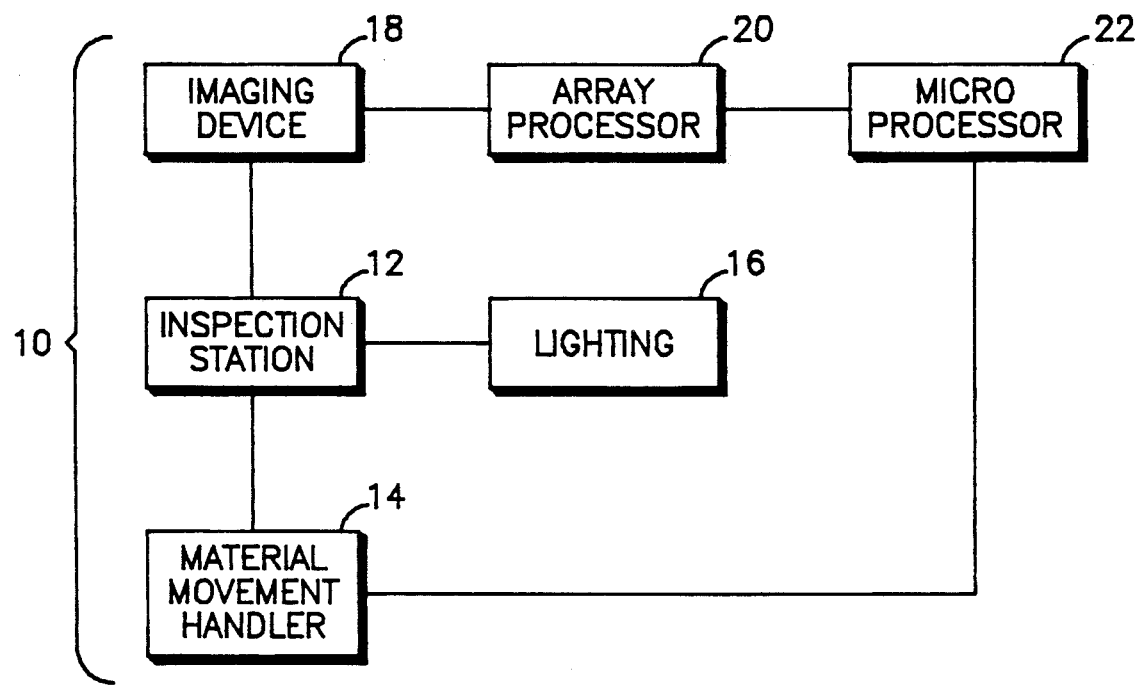
FIG. 1 is a block diagram of the various major parts of the protruding feature inspection system of the present invention.

Shown in FIG. 1 is a block diagram of the vision system 10 of the present invention. The electronic packages to be inspected are brought individually to an inspection station 12 by the material movement handler 14. A lighting system 16 illumines the features of the object to be inspected, here the leads of the DIP, and a picture of the object is taken by the imaging device 18, such as a camera. The video signal produced by the imaging device 18 is then digitized and stored in a two dimensional array. The array may be any suitable size, but in the particular embodiment to be described, the array is a 512×512 array using 8-bit data. This array gives a quarter megabyte (262,144 bytes) worth of information, which is a considerably large amount of information to process. In image processing, each piece of data is referred to as a picture element, or "pixel". This data needs to be segmented by an array processor 20 which presents the relevant information to a microprocessor 22 that can then analyze this information and decide whether the object or package being inspected is defective or not. In turn, microprocessor 22 sends a "good" or "reject" signal to the material movement handler 14 which then sorts the part into the appropriate bin.

INSPECTION STATION AND LIGHTING SYSTEM

During the manufacture of DIP integrated circuits (ICs), the leads of the parts are inspected to assure that they are not bent or missing. Conventionally, this has been done by human operators looking at the leads. If an operator believed that a lead was bent by more than a certain dimension (e.g. 0.010 inches), the lead would be manually straightened, otherwise, the package was passed. It is apparent that this inspection method involves subjective measurement. As parts become smaller and the emphasis on quality and defect-free products becomes greater, the tightened specifications cannot be met by this labor-intensive, subjective method. The inventive vision system provides an objective inspection technique that is faster, less expensive and more reliable than the conventional method.

It was surprisingly discovered that a crucial part of the vision system was the design of the inspection station 12 and the lighting system 16 used therewith. It was found that the vision system would work best if only the tips of the protruding features, or leads in the example, were illuminated, with the rest of the object being as dark as possible. This was not a trivial task. A number of different configurations were tried, including a complex fiber optic arrangement that directed a single fiber optic light beam at each lead. The inspection station is important because the image can be enhanced with the appropriate lighting at no increased cost in time.

Figure 2:
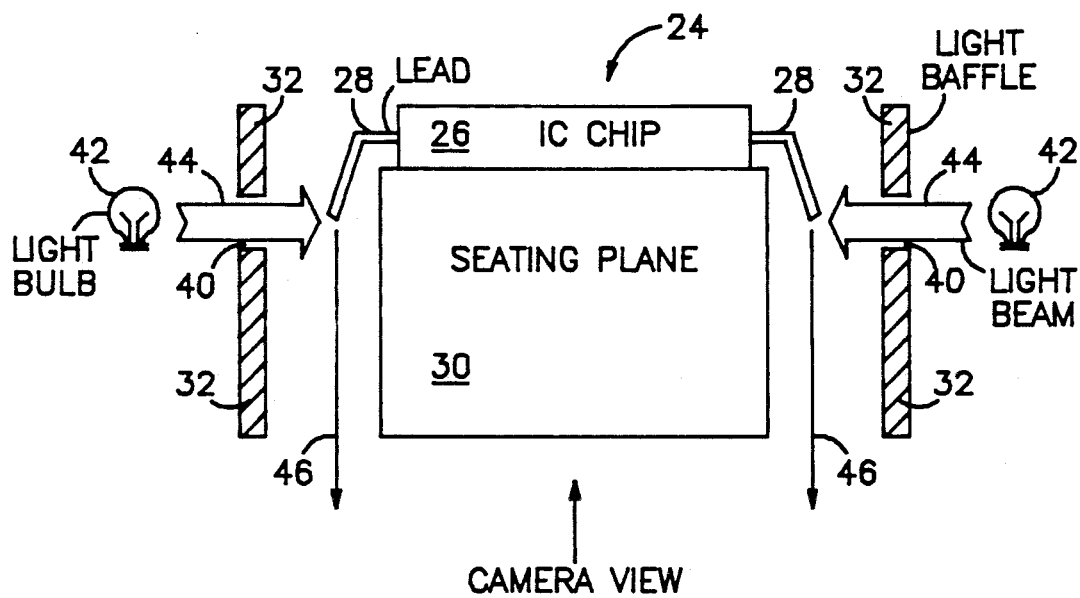
FIG. 2 is an end view of the lead illumination station that is part of the lead inspection system of the present invention.

Shown in FIG. 2 is the configuration determined to be the best showing the inspection station 12 and an integrated circuit DIP 24 seen from the end positioned therein. DIP 24 has a package body 26 from which a plurality of leads 28 extend therefrom and turn downward in the same direction on both sides of body 26. This enables DIP 24 to be mounted into through-holes on a printed circuit board. DIP 24 is moved by the material movement handler 14 to its position on a seating plane 30, which may be any flat surface that permits leads 28 to extend over the sides thereof. The seating plane 30 is flanked by light baffles 32. Light baffles 32 have a longitudinal slit 40 in a position matching the length of the leads 28. A plurality of holes is not used because, as will be explained, the parts 24 do not stop at the same position in the inspection station 12 each time. Thus, the holes would not be properly registered with the leads 28. Additionally, a variety of lead 28 spacing or pitches may be accommodated with one slit rather than holes at set spacings.

Light bulbs 42 shine light beams 44 through the slits 40 onto only the ends of leads 28. Reflected light beams 46 from the ends of leads 28 are reflected back toward the imaging system or camera 18. This station configuration 12 shows both rows of leads to a single camera 18.

However, in another embodiment holes may be used instead of slits. The diameter of the holes 40 or the width of the slit 40 is only about 20 mils in one version. To get enough light to reflect from the tips of the leads 28, which are 10×20 mils in this example, a high intensity light is needed. Of course, the frequency of the light must be compatible with the frequency response of the camera 18.

IMAGE FROM INSPECTION

Figure 3:
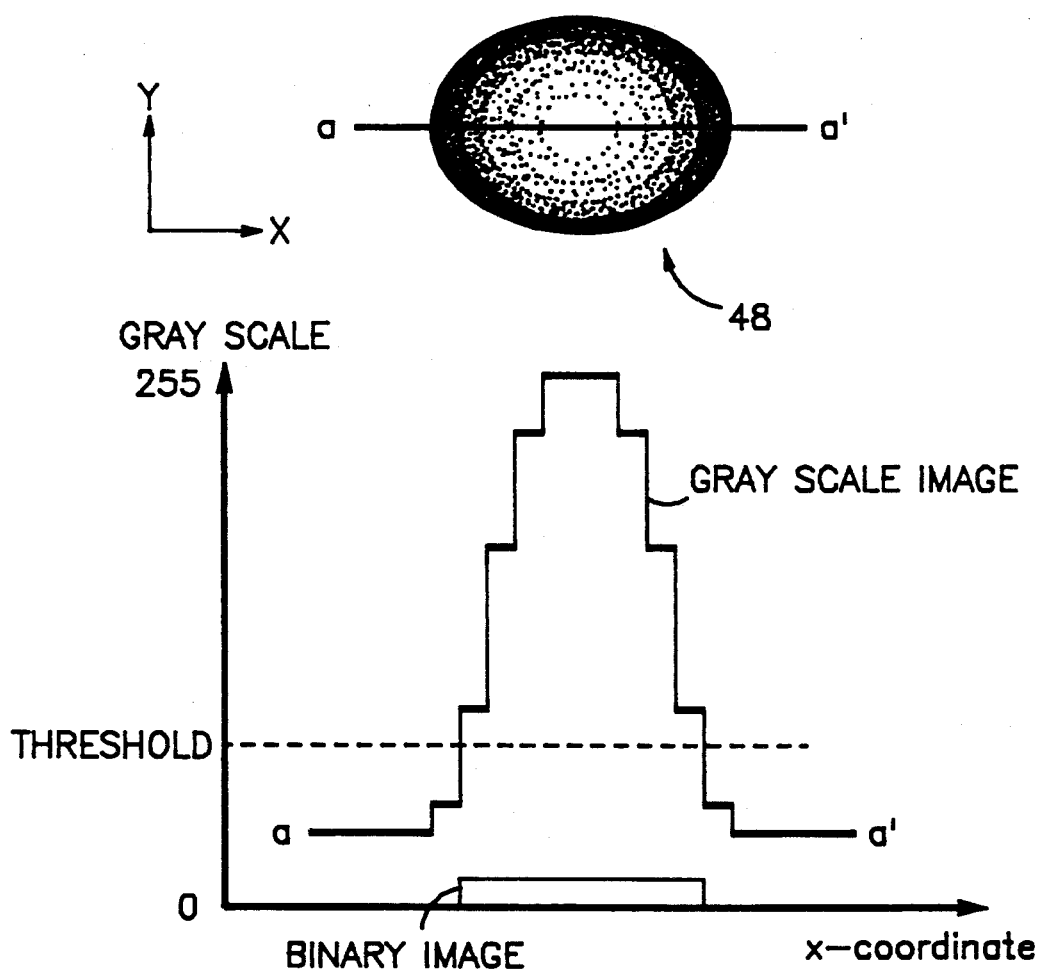
FIG. 3 is a schematic illustration of the light intensity distribution and how the light intensity distribution, as a function of distance, is perceived by a digital imaging system.

The camera 18 sees a bright spot at each lead tip. One of these spots or lead tip images 48 is shown in FIG. 3. The lead 28 is bright in the center, and the intensity decreases as the distance from the center of the lead increases, both in the x and y directions shown. Also shown in FIG. 3 is a chart of the binary and gray scale image of the bright spot 48 taken along line a-a' as a function of distance along the x direction. The pixel values can vary between 0 and 255 (for 8 bit data) where 0 is the state of no light and 255 is the state of full illumination. The states in between are of intermediate brightness.

INSPECTION INFORMATION MANIPULATION

The inspection information manipulation procedure will first be described with reference to a precise procedure and then in terms of a somewhat less precise method using techniques of mathematical morphology.

Figure 4:
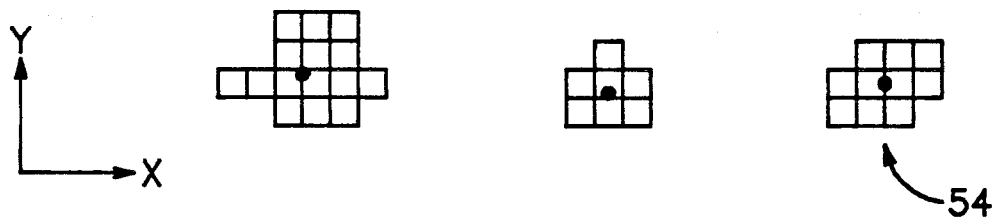
FIG. 4 is a schematic illustration of imaging system pixels corresponding to leads showing the calculated centroid for each cluster of pixels.

To find the location of each lead, the gray scale image in FIG. 3 has a threshold applied to it. If the gray scale value of a particular pixel is greater than the threshold, a value of one is given to that pixel, otherwise a value of 0 is assigned. This transformation, performed by the array processor 20, maps the gray scale image (8 bits per pixel) to a binary image (1 bit per pixel). The digital binary images of three leads are shown in FIG. 4. This segmentation technique reduces the data from 2,097,152 bits to 262,144 bits.

Next, the data bits are then grouped together and the centroid 52 of each cluster 54 is computed to provide an array of calculated (x,y) coordinates. Each centroid 52 has an x and y value which represents the coordinates of the lead tip. Note that even though the digital image has only integer values, the centroid 52 is a real number. This allows the system to locate the leads within a fraction of a pixel 50 which provides more accurate measurements than estimating to the nearest pixel. In one embodiment, a pixel 50 is as wide as 0.005 inches, which is unsuitable for accuracies within ±0.001 inches. By using sub-pixel measurements, the requisite accuracy is achieved.

To summarize the computations performed, an image containing a quarter megabyte of data has been transformed to a calculated array of (x,y) coordinates, one for each lead. This data is then passed to the microprocessor 22 which performs the measurements on the leads.

To measure the lead bentness in the x-coordinate, the x value of each lead location is compared with an absolute location. The absolute location of coordinates is stored in an array of ideal (x,y) coordinates 56. The array of ideal (x,y) coordinates 56 is determined by passing a number of known "good" objects through the vision inspection system and taking the average of their locations. For the computer inspection system, this learning phase does not take very long. The "learning" of the parts must be performed for each part type, for example, in the instance of a different lead pitch or lead spacing. Alternatively, the ideal (x,y) coordinates can be calculated if a mapping from the real world space to the imaging space can be found.

Figure 5:
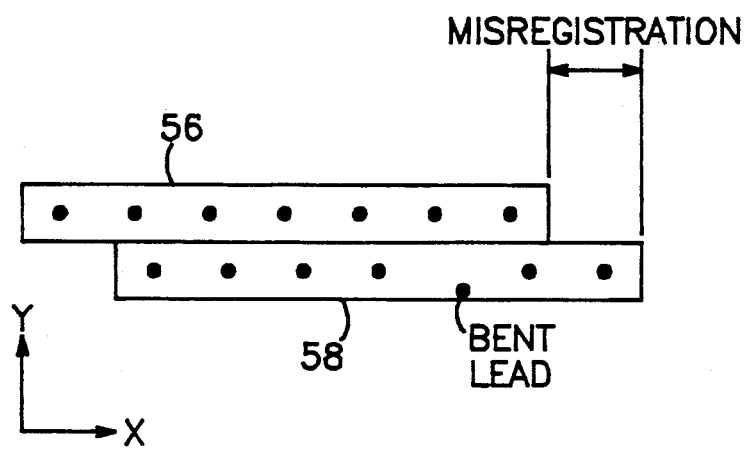
FIG. 5 is a schematic illustration of how an array of calculated (x,y) coordinates ordinarily is misregistered in the x direction with respect to an array of ideal (x,y) coordinates.

The x-coordinate of the ideal array 56 is compared with the x-coordinate of the array 58 as shown in FIG. 5. For the comparison to be effective, no misregistration of the two sets of data is allowed as shown in FIG. 5. The misregistration is due to the fact that the DIPs 24 do not stop at exactly the same location in the inspection station 12 and thus are not always at the same location in front of the camera 18 every time the video image is received.

Figure 6:
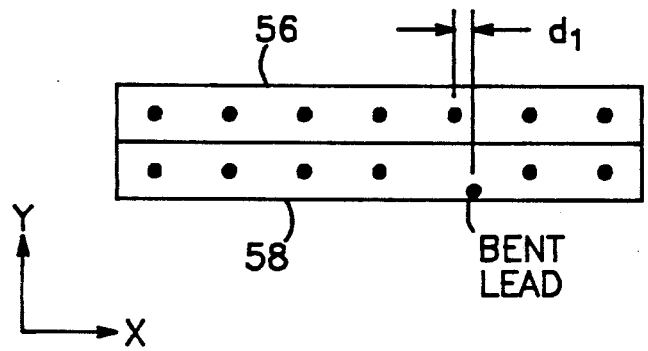
FIG. 6 is a schematic illustration of how an array of calculated (x,y) coordinates may be registered in software with an array of ideal (x,y) coordinates.

To solve this problem, the array of calculated (x,y) coordinates 58 could be "moved" in the program software of the microprocessor 22 to minimize the mean squared error of the deviation between the two arrays 56 and 58. This minimizes the overall deviation including the bent lead deviations, which may undesirably skew the registration and cause the object to be rejected because all of the leads would be noted as bent. For this reason, only the (x,y) coordinates of the best leads are used to register the two arrays 56 and 58 of data. This registration is accomplished by taking the difference of the x-coordinates between the two sets of data. This difference data is then clustered. Clustering is a method of grouping a set of data into subsets. Each element of a subset has a very short distance to the elements of its own subset and a larger distance to the elements of all the other subsets. For example, if the difference data is {19, 22, 26, 20, 27, 30, 21}, we can cluster the data in three subsets {19, 20, 21, 22}, {26, 27}and {30}. The elements of the largest cluster are used to calculate the misregistration. In the example, the subset {19, 20, 21, 22} would be used. Their average is calculated and used to translate all of the leads. Once this is performed, as shown in FIG. 6, the difference $d_1$ in the x coordinates between the ideal location and the calculated location of the leads being inspected is computed. If any deviation is greater than the specification, the part is rejected as "bad"; otherwise it is passed as "good".

Figure 7:
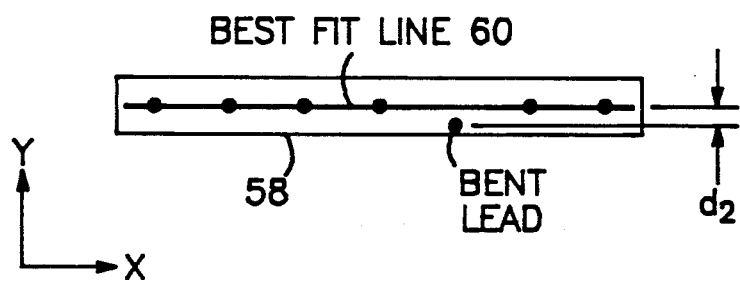
FIG. 7 is a schematic illustration of an array of examined (x,y) coordinates corresponding to leads is examined with respect to alignment in the y direction.

To inspect the leads in the y coordinate, the best fit line 60 for each of the two rows of leads is computed The distance between the best fit line and the suspected bent lead's y-coordinate, $d_2$ is computed as schematically illustrated in FIG. 7. Again, if $d_2$ is outside the specification, the DIP 24 is rejected as "bad". Also, the slopes and the y-intercepts of the best fit lines 60 are compared to each other and to a predetermined specification to determine if the leads as a group are outside the specification.

It is apparent that the array of calculated (x,y) coordinates 58 is not compared with an array of ideal (x,y) coordinates to determine the y-direction specification. This difference is due to the fact that for DIP parts 24, the y-direction planarity is only important with respect to how the leads align with each other, rather than with how they are spaced from a reference point. By contrast, the spacing in the x-direction is critical to permit the leads 28 to properly register with and be mounted in the through-holes on a printed circuit board.

Note also that if a lead is missing, the number of calculated (x,y) coordinates will be less than expected. This is a sufficient condition to detect missing leads and thereby reject the part. This situation is also a rough test for leads that are too long or too short and thus not coplanar in the z direction (normal to the x-y plane). Under these conditions, the light beam 46 will not reflect properly from the end of the lead 28 and be less intense, possibly not reaching the threshold shown in FIG. 3 and therefore will not be seen by the imaging device.

If the parts to be inspected can be placed accurately in front of the imaging device 18 consistently, another method can be used. This method does not use subpixel measurements. This method uses known principles of mathematical morphology. If the reader is unfamiliar with these principles, reference may be had to copending patent application Ser. No. 140,704, incorporated by reference herein. For further reference, see Matherton, George, *Random Sets and Integral Geometry*, Wiley, 1975 and Serra, Jean, *Image Analysis and Mathematical Morphology*, Academic Press, 1982.

Before inspecting the leads 28 of a particular DIP 24 under consideration, a few parts, such as on the order of 7 to 15, are presented to the system 10 and the average location of each lead 28 is calculated. The average location is computed to create the mask of ideal (x,y) coordinates used during the inspection.

To locate the leads, the highest grayscale value of each lead umbra is isolated by Eq. 1.

$$Y = max[(X-c) \oplus B, 1] - (X-c) \quad (1)$$

where
X is the original image snapped by the camera
B is a three dimensional structuring element
c is a constant By subtracting the constant c from the original image X, we eliminate the background noise and isolate the umbra of each lead. The constant c should be larger than the peak levels of the camera noise and background lighting $n_{max}$ and smaller than the lowest gray scale value of the umbra tip $l_{low}$. Note that (X−c) gives some negative numbers. These numbers should be replaced by zeroes.

The second operation in Eq. 1 is the dilation of (X−c) by a three dimensional structuring element B. B has the shape of a six-sided polyhedron of length and width d, height 0, for example. This structuring element flattens the tip of the umbrae and duplicates the peak values in an area of dimensions dxd. The max is taken to replace all zero values by 1. The new umbra created, differs from image (X−c) at every point except at the tip of the leads where the gray scale values are equal; see FIG. 8. By subtracting the two umbrae we get a value of zero at the lead tip and values strictly greater than zero everywhere else. A new, two dimensional binary image is created from Y of Eq. 1 by replacing all zeroes by ones and all other values by zeroes. The location of the ones are given by $(x_{ij}, y_{ij})$ where i is the number of the leads learned and j is the number of the part learned.

After learning a few parts, the average location for each lead is computed by $$(x_i, y_i) = \Sigma j = 1, n (x_{ij}, y_{ij})/n \quad (2)$$

where
n is the number of parts learned.

The image with a value of one at locations $(x_i, y_i)$ and zero everywhere else is called L. The mask M for the inspection of the leads is computed by Eq. 3.

$$M = (L \oplus B)' \quad (3)$$

where

B is a two dimensional structuring element.

In Eq. 3, each point $(x_i, y_i)$ is dilated by B, which is a square of size w, where w is the maximum deviation of the lead allowed by the inspection criteria. The dilated image is complemented and stored in image M. FIG. 9 shows the operation of Eq. 5 for one of the leads.

To inspect the leads, an image is snapped by the camera. The highest gray scale value for each lead is found using the same algorithm as in the learning phase. The resulting image, with a value of one at the lead tips and zero everywhere else, is stored in Y. To insure that all the leads are present, the number of ones in Y are counted. If they are equal to the number of leads per package, all the leads are present. Otherwise, some leads are missing and the part is rejected.

The second step in the lead inspection is the detection of bent leads. Image Y is transformed by Eq. 4.

$$Z = Y \cap M \quad (4)$$

If $Z = \phi$, the null or empty set, none of the leads are bent and the part is passed, otherwise the number of ones in Z equals the number of bent leads and the part is rejected. This operation is shown in FIG. 10 for a good lead (on the left) and a bad lead (on the right).

This method can be less precise than the first method described. The sub-pixel precision of the previous method is thus not obtained. It will be appreciated that if the parts cannot be placed at the same position in the inspection station consistently, the registration procedure of the first technique may be used in combination with the morphological technique.

I claim:

1. A method for inspecting a plurality of similar protruding features on objects to determine whether the object is "good", or "bad", comprising:

providing a plurality of objects individually at an inspection station, where each object has a plurality of protruding features having tips as a terminal end thereof;

illuminating only the tips of the features of a single object with a light source to generate a pattern of tip images corresponding to the package;

perceiving the pattern of tip images by means of a computer imaging system that receives a digital array of gray scale pixels and sets a brightness threshold for pixels corresponding to the lead tip images;

determining from the pattern of resolved tip images an array of calculated (x,y) image space coordinates corresponding to the package by grouping the pixels above the threshold together in a cluster for each tip and mathematically calculating the centroid of each cluster of pixels;

translating the array of ideal (x,y) coordinates to minimize the means squared error of the (x) coordinate deviation between the ideal array and the calculated array;

computing the difference in the (x) coordinates between the ideal array and the calculated array and computing the best fitting straight line through the (y) coordinates of the calculated array and determining the difference of each (y) value from the best fitting line;

deciding (1) whether the array of calculated (x,y) image space coordinates is within a predetermined acceptable deviation range from the array of ideal (x,y) image space coordinates and denoting the corresponding objects as "good" or (2) whether the array of calculated (x,y) image space coordinates is outside the predetermined acceptable deviation range and then denoting the objects as "bad"; and sorting the "good" objects from the "bad" objects.

2. The method of claim 1 wherein the step of fitting the image space coordinates within the predetermined range is accomplished by a clustering technique.

3. A method for inspecting a plurality of similar leads of electronic packages to determine whether the package is "good", or "bad", comprising:

providing a plurality of integrated circuit packages individually at an inspection station;

illuminating only the tips of the features of a single package with a light source to generate a pattern of lead tip images corresponding to the package;

perceiving the pattern of lead tip images by means of a computer imaging system that receives a digital array of gray scale pixels and sets a brightness threshold for pixels corresponding to the lead tip images;

determining from the pattern of lead tip images an array of calculated (x,y) image space coordinates corresponding to the package by grouping the pixels above the threshold together in a cluster for each lead and mathematically calculating the centroid of each cluster of pixels;

translating the array of ideal (x,y) coordinates to minimize the mean squared error of the (x) coordinate deviation between the ideal array and the calculated array;

computing the difference in the (x) coordinates between the ideal array and the calculated array and computing the best fitting straight line through the (y) coordinates of the calculated array and determining the difference of each (y) value from the best fitting line;

deciding (1) whether the array of calculated (x,y) image space coordinates is within a predetermined acceptable deviation range from the array of ideal (x,y) image space coordinates and denoting the corresponding objects as "good" or (2) whether the array of calculated (x,y) image space coordinates is outside the predetermined acceptable deviation range and then denoting the object as "bad"; and sorting "good" objects from the "bad" objects.

4. The method of claim 3 wherein in the step of illuminating the tips, high intensity light is directed onto the tips through a slit in a light baffle.

5. The method of claim 3 further comprising creating the array of ideal (x,y,), image space coordinates by inspecting a plurality of similar objects known to be at least "good", by the method of this invention and taking an average thereof.

6. The method of claim 3 wherein the step of fitting the image space coordinates within the predetermined range is accomplished by a clustering technique.

7. A method for rejecting an object if a feature extending therefrom deviates from a predetermined position relative thereof by more than a selected amount, comprising the steps of:

positioning the object at a precise location;

illuminating the feature to emphasize a distal end thereof;

developing a gray scale image of the distal end of the feature with respect to the precise location of the object;

analyzing the gray scale image using mathematical morphology to locate the distal end of the feature and resolve the distal end to one pixel to determine an actual position of the feature with respect to the object;

translating the analyzed image to minimize the mean squared error of the spatial deviation between the analyzed image and the predetermined position;

computing the difference in between the predetermined position and the analyzed image; and rejecting the object if the deviation exceeds the selected amount.

8. The method of claim 7 where in the step of illuminating the features to emphasize a distal end thereof, a high intensity light is directed onto the distal end through a slit in a light baffle.

* * * * *